United States Patent
Mainz et al.

(10) Patent No.: US 10,981,424 B2
(45) Date of Patent: Apr. 20, 2021

(54) SUSPENSION CONTROL ARM WITH INTEGRATED RESILIENT ELEMENT

(71) Applicant: FORD GLOBAL TECHNOLOGIES, LLC, Dearborn, MI (US)

(72) Inventors: Daniel Mainz, Herzogenrath (DE); Friedrich Wolf-Monheim, Aachen (DE); Rainer Souschek, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/036,353

(22) Filed: Jul. 16, 2018

(65) Prior Publication Data

US 2019/0030972 A1    Jan. 31, 2019

(30) Foreign Application Priority Data

Jul. 25, 2017   (DE) .................... 10 2017 212 746.5

(51) Int. Cl.
*B60G 7/00*   (2006.01)
*B60G 11/24*  (2006.01)

(52) U.S. Cl.
CPC ............ *B60G 7/001* (2013.01); *B60G 7/005* (2013.01); *B60G 11/24* (2013.01); *B60G 2202/143* (2013.01); *B60G 2204/125* (2013.01); *B60G 2204/1431* (2013.01); *B60G 2204/41* (2013.01); *B60G 2204/4502* (2013.01);
(Continued)

(58) Field of Classification Search
CPC .... B60G 11/22; B60G 11/24; B60G 2202/14; B60G 2202/143; B60G 2204/125; B60G 2204/1431; B60G 2204/41; B60G 2204/4502; B60G 7/001; B60G 7/005; B60G 7/04; B60G 2206/012; B60G 2206/014; B60G 2206/122; B60G 2206/7101; B60G 2206/722
See application file for complete search history.

(56) References Cited

U.S. PATENT DOCUMENTS 2,162,828 A * 6/1939 Slack .................. B60G 3/20
                                              280/86.751
5,267,751 A * 12/1993 Hiromoto ............ B60G 3/10
                                              280/124.134
(Continued)

FOREIGN PATENT DOCUMENTS

CN    203543563 U    4/2014
CN    204451889 U    7/2015
(Continued)

OTHER PUBLICATIONS

Shuang Xu et al, Elasto-kinematics design of an innovative composite material suspension system, Mechanical and Aerospace Department, Feb. 24, 2017, Italy, 12 pages.

*Primary Examiner* — Laura Freedman
(74) *Attorney, Agent, or Firm* — Raymond L. Coppiellie; Brooks Kushman P.C.

(57) ABSTRACT

There is provided a control arm comprising a shell-like shell of a first material and a reinforcement of a plastic material, wherein the reinforcement has a flex-element which protrudes therefrom and which can be supported or guided by means of a vehicle structure in order in the event of jounce and/or rebound of the suspension to produce a resilient action equivalent to a conventional spring.

14 Claims, 2 Drawing Sheets

(52) U.S. Cl.
CPC .. *B60G 2206/012* (2013.01); *B60G 2206/014* (2013.01); *B60G 2206/122* (2013.01); *B60G 2206/7101* (2013.01); *B60G 2206/722* (2013.01)

(56) References Cited

U.S. PATENT DOCUMENTS

| | | | | |
|---|---|---|---|---|
| 6,719,108 | B2* | 4/2004 | Hasegawa | B60G 7/001 |
| | | | | 188/268 |
| 6,733,023 | B2* | 5/2004 | Remmert | B60G 11/16 |
| | | | | 267/179 |
| 7,556,273 | B2* | 7/2009 | Streubel | B60G 7/001 |
| | | | | 264/261 |
| 7,938,417 | B2* | 5/2011 | Ersoy | B60G 7/001 |
| | | | | 280/124.134 |
| 9,610,820 | B1* | 4/2017 | Chen | B60G 15/04 |
| 10,442,262 | B2* | 10/2019 | Kwon | B60G 7/00 |
| 2004/0135337 | A1* | 7/2004 | Alesso | B60G 7/001 |
| | | | | 280/124.134 |
| 2012/0315414 | A1 | 12/2012 | Wesch et al. | |
| 2016/0016342 | A1* | 1/2016 | Al-Dahhan | B29C 44/569 |
| | | | | 267/292 |
| 2016/0101660 | A1 | 4/2016 | Wolf-Monheim | |
| 2018/0194313 | A1* | 7/2018 | Mukainakano | B60R 19/565 |
| 2019/0061452 | A1* | 2/2019 | Lee | B29C 45/14 |
| 2019/0315173 | A1* | 10/2019 | Kim | B60G 7/001 |

FOREIGN PATENT DOCUMENTS

| | | | |
|---|---|---|---|
| CN | 204687775 U | | 10/2015 |
| CN | 205871654 U | | 1/2017 |
| DE | 102011003971 A | | 8/2012 |
| JP | 2007276660 A | * | 10/2007 |
| KR | 20100074552 A | | 7/2010 |

* cited by examiner

SUSPENSION CONTROL ARM WITH INTEGRATED RESILIENT ELEMENT

CROSS-REFERENCE TO RELATED APPLICATIONS

This application claims foreign priority benefits under 35 U.S.C. § 119(a)-(d) to DE Application 10 2017 212 746.5 filed Jul. 25, 2017, which is hereby incorporated by reference in its entirety.

TECHNICAL FIELD

The invention relates to a control arm for an automotive suspension system, and to such a control arm having a resilient flex-element for absorbing kinetic energy during suspension jounce and/or rebound.

BACKGROUND

Vehicles generally have suspension or damping devices serving to absorb unevenness of the roadway over which the vehicle wheels are rolling and thereby isolate the un-sprung portion of the vehicle from unwanted bumps and roughness that may occur during jounce and/or rebound of the wheels and related suspension components. To this end, modern passenger vehicles and light utility vehicles often employ helical spring suspensions or compressed air suspensions which, in combination with a hydraulic damper, control the movement of the vehicle and consequently influence the travel behavior in a positive manner. In this instance, the springs and the dampers are often oriented in a vertical position, and therefore a specific space must be provided for these components at the expense of utility space for passengers or loads space. The objective is therefore to provide alternatives to conventional vehicle suspensions.

SUMMARY

A vehicle suspension control arm defines or supports a plurality of bearings and/or bushings to movably connect the control arm with un-sprung portions of the vehicle structure and with an axle. The control arm comprises a shell formed of a sheet of a first material, a reinforcement formed of a plastic material which is permanently secured to the sheet, and a resilient flex-element that is formed integrally with the reinforcement and extends therefrom to be supported or guided by a portion of the vehicle structure. When the control arm is operatively installed in the vehicle, a contact The
   a substantially concave, shell-like construction
   supported or guided by The disclosed control arm is advantageous since the resilient flex-element serves as a spring, providing the control arm with a resilient, shock-absorbing function. A conventional helical spring or compressed air suspension of a vehicle is thereby not necessary, whereby comparatively more space can be provided for persons and/or useful loads. In addition, weight is thereby saved and fewer components have to be installed, for which reason the control arm according to the invention is also more cost-effective than conventional suspensions.

Control arms, such as, for example, transverse or longitudinal control arms, are used in almost all wheel suspensions and axles of motor vehicles and are used for movable connection of a wheel and/or axle to the vehicle to a defined extent. The shell is constructed of a sheet material (usually steel or a metal having similar properties) and may be formed into a concave, shell-like configuration to minimize the weight and required structural space of the control arm. The reinforcement may be formed of a plastic material (which may be reinforced by fibers or other components) and is permanently bonded or secured to the base-member to achieve the specific strength and rigidity requirements. Such a hybrid metal/reinforced-plastic construction of a control arm affords known advantages, such as low weight and sufficient rigidity and strength and corrosion resistance.

The plurality of bearing or bushing locations of the control arm serves to connect a wheel to the un-sprung structure (frame, subframe, body, or other portion or component] of a vehicle and where applicable to receive another chassis component, for example, a suspension strut.

The resilient, spring-like property of the control arm according to the invention and consequently also the driving properties of the corresponding vehicle are influenced in particular by the geometry and material of the flex-element which can be selected in accordance with the desired properties. The flex-element produces the resilient action to the extent that the corresponding vehicle axle/wheel/tire combination moves during jounce and rebound (usually in a generally vertical direction) during the movement of the vehicle over a road surface.

In a preferred embodiment, the flex-element is constructed in a fin-shaped manner. The term "fin-shaped" is intended to mean that, in this preferred embodiment, it is sized to be larger in the longitudinal orientation thereof than in the width thereof. It resembles in this form, for example, the fin of a whale, a tail unit of an aircraft or a guide vane of an aircraft turbine. The flex-element may be constructed to project substantially perpendicular to the plane defined by the reinforcement and the shell.

The term "the vehicle structure" refers to an un-sprung component of the corresponding vehicle in the immediate vicinity of the control arm and may be, depending on the design configuration of the vehicle, some portion of the bodywork, the frame or a sub-frame. The element or portion of the vehicle structure that contacts, supports, or guides the flex-element in order to cause it to deflect or deform during jounce/rebound of the suspension (referred to herein for simplicity as a contact-element) may be a special purpose element added to the vehicle, or may be an existing vehicle component if the design permits. The contact-element transmits force to the flex-element, which is deformed in accordance with the force applied. In this instance, a resilient action of the control arm which corresponds to the acting force is achieved. Consequently, the control arm according to the invention provides a suspension having spring or energy-absorbing/returning characteristics equivalent to a conventional vehicle suspension.

The plastic material of the reinforcement may comprise plastics which are known to the person skilled in the art and which may have different macromolecules. The reinforcement may, for example, be formed by polyamide 6. The material of the reinforcement preferably has a fiber-reinforced plastic material. The material of the fibers may be selected from carbon, glass or another technically suitable material. The fibers may, in a particularly advantageous embodiment, be carbon fibers. The plastic forming the reinforcement may, for example, be formed with 60% carbon fibers. Plastic material which is reinforced with fibers has with a high level of wear resistance being maintained a very high strength, rigidity and dimensional stability which is advantageous for use in a vehicle control arm. The material of the reinforcement may be referred to as the "second material," to distinguish from the "first material" of which the shell is formed.

The flex-element may advantageously be produced in a production process integrally with the reinforcement. Therefore, it is advantageous for the flex-element and the reinforcement to comprise a common material. The flex-element may, however, also comprise a different plastic material from that of the reinforcement; in this instance, the reinforcement may be produced with the flex-element, for example, using a so-called 2K tool.

The material of the shell, also referred to as the first material, is preferably a metal material. The material may, for example, be a steel sheet which is formed with thin walls in order to save weight and which has ductile properties. The strength and rigidity requirements of the control arm are contributed to substantially by the reinforcement. In place of a purely metal material, an organo sheet can also be used or in another alternative also a plastic material.

The shell of the control arm may have an opening formed therein which corresponds to the shape of the flex-element and through which the flex-element passes as it extends from the reinforcement toward the contact-element. The combination of shell and reinforcement is thereby additionally strengthened. Furthermore, forces acting on the flex-element can consequently be borne in part by both the reinforcement and the shell, and thereby influence the resilient action.

The shell of the control arm may have at least one flange extending along/around some or all of the periphery of the opening. In a particularly advantageous manner, the opening has at two opposing sides a respective flange which serve to transfer forces acting on the flex-element in an even more effective manner to the shell and reinforcement. In addition, the flanges also act in a favorable manner on the durability of the shell and reinforcement.

The shell and the reinforcement of the control arm may be connected to each other by means of mechanical bonding. It may also be desirable for the shell and the reinforcement to be connected to each other by adhesive bonding.

A second aspect of the invention relates to the use of a control arm according to the invention for the suspension of a vehicle.

A third aspect of the invention relates to a vehicle having a control arm according to the invention.

The invention is explained in greater detail with reference to the Figures, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
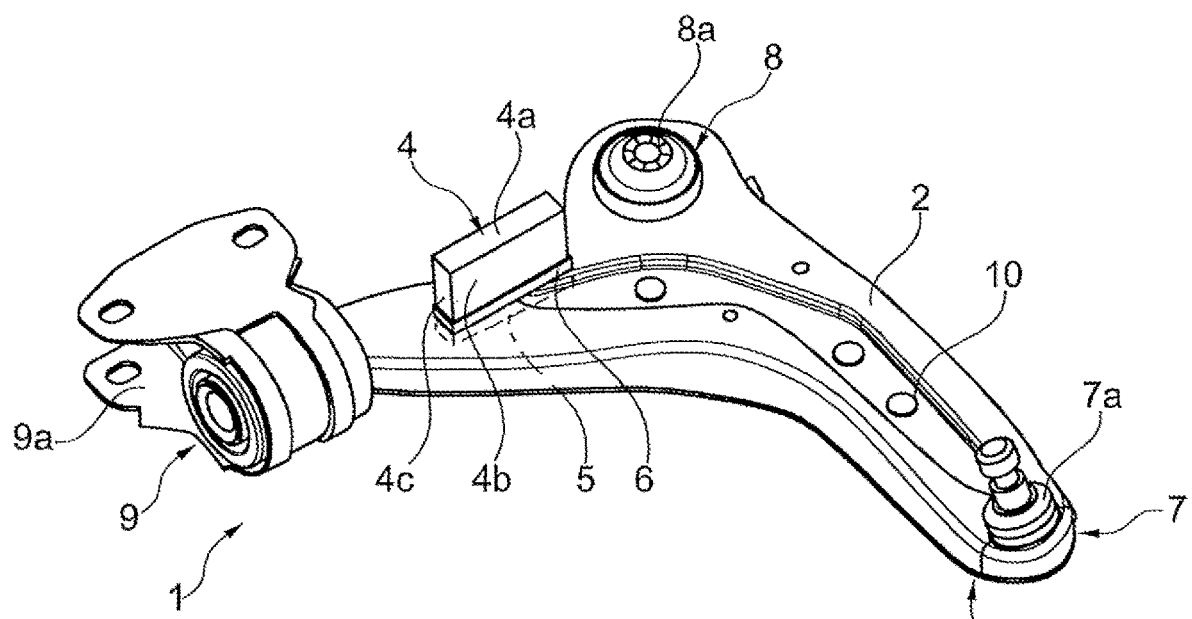
FIG. 1 is a perspective view of an upper side of a control arm according to an embodiment of the invention.

Referring to FIG. 1, an embodiment of a control arm 1 according to the invention is constructed as a three-point control arm with three securing locations and can be used for a type of suspension in which three suspension locations are used. The control arm 1 comprises a thin, sheet-like shell 2, the sheet formed such that a lower side (opposite from the upper side visible in FIG. 1) thereof is generally concave. The material of the shell 2 may advantageously be metal; to this end, it may be formed, for example, from a deep-drawn sheet of steel or other metal having appropriate strength and stiffness properties. Alternatively, in place of a purely metal sheet, an organo sheet may also be used as the material of the shell 2, or an appropriate plastic material.

The control arm 1 further comprises a reinforcement 3 (see FIG. 2) permanently secured or bonded to the shell 2, with the general structure of the control arm therefore being described as a hybrid control arm. The reinforcement 3 comprises plastic material, and may advantageously be a carbon-fiber-reinforced plastic material. The reinforcement 3 is, for example, produced by means of an injection-molding method, wherein molten plastic material is injected directly into/onto the concave or lower side of the shell 2 in order to produce a materially integral connection between the shell 2 and the reinforcement 3. The connection or bond between the shell 2 and the reinforcement 3 may be strengthened in a suitable manner, for example, by means of adhesive bonding or mechanical locking. The shell 2 may, for example, have a collar or lip 2a (see FIG. 2) extending around some or all of its periphery which wraps around the reinforcement 3. Additionally, or alternatively, the shell 2 may define one or more openings 10 which serve to strengthen the connection with the reinforcement 3, as will be illustrated by the plastic material of the reinforcement 3 extending into the openings 10.

Figure 2:
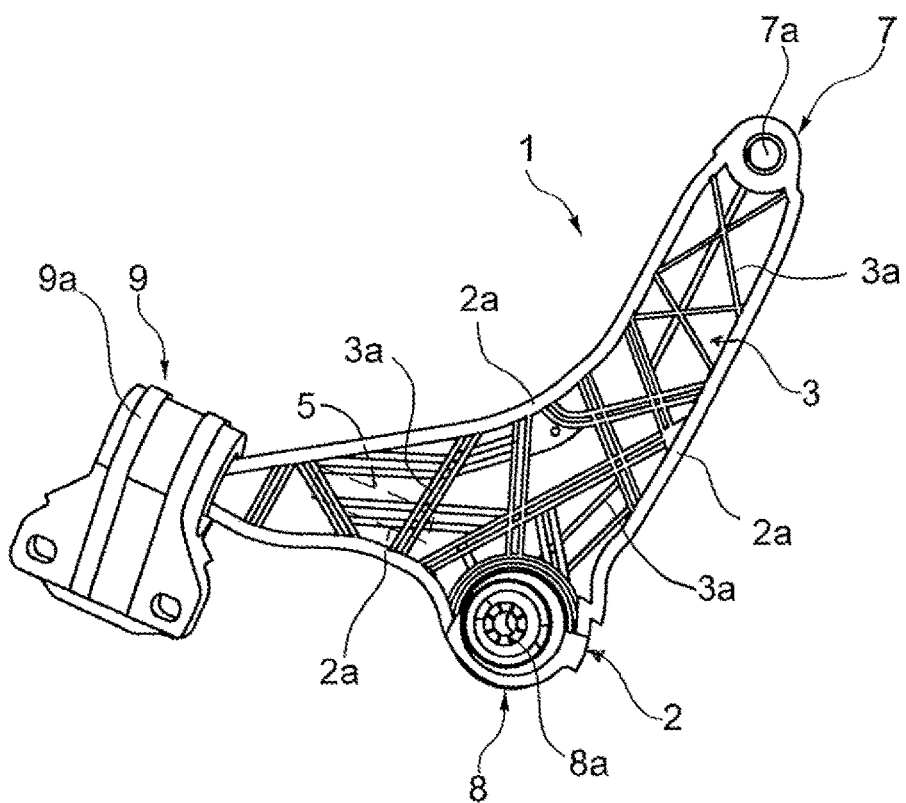
FIG. 2 is a perspective view of a lower side of the control arm according to FIG. 1.

In FIG. 2, the lower or concave side of the control arm 1 illustrated in FIG. 1 is shown. It can be seen that the reinforcement 3 may comprise different substructures, for example, ribs 3a which are configured to improve the strength and/or rigidity of the control arm 2.

The control arm 1 has (as is well known in the pertinent art) three securing locations 7, 8, 9 that are adapted to connect a wheel/axle combination (not shown) with unsprung vehicle structure. In the first securing location 7 there is arranged a ball joint 7a by means of which the control arm 1 can be connected to an axle (not shown). In the second securing location 8, a first bushing 8a is arranged and in the third securing location 9 a second bushing 9a is arranged. The bearing bushes 8a, 9a are constructed differently in FIG. 1, but could also be constructed in an identical manner. The bushings serve, for example, to secure the control arm to the bodywork and where applicable another structure.

A fin-like flex-element 4 extends from the reinforcement 3 toward the upper side (the side visible in FIG. 1) of the control arm 2. To this end, there is provided in the shell 2 an opening 5 through which the flex-element 4 projects. In the embodiment shown herein, the flex-element 4 has an elongate form so that it is longer than it is wide, and accordingly (as shown in FIG. 1) has the form of a rectangular prism. That is to say, the upper face 4a is rectangular, larger lateral faces 4b extend perpendicularly to the longer sides of the upper face 4a, and smaller lateral faces 4c extend perpendicularly to the upper face 4a and the larger lateral faces 4b. The flex-element 4 may, however, alternatively be of a different shape if this is advantageous in a specific vehicle application. For example, the shape of the upper face 4a may be square, round or oval. The height of the flex-element 4 (the distance by which it projects above the surface of the shell 2) may be adapted to the respective vehicle conditions. The significant aspect of the configuration of the flex-element 4 it that it contacts the corresponding vehicle structure (as shown in FIG. 3) in order to resiliently deform and thereby act as a suspension during jounce and/or rebound of the suspension.

The flex-element 4 comprises in a preferred embodiment the same plastic material as the reinforcement 3 (that is, the two elements are produced from a common plastic material), whereby it can be produced integrally with and at the same time as the reinforcement 3 is produced. In an alternative embodiment, the flex-element may comprise a plastic material different from that of the reinforcement 3 and, for example, be constructed by means of a dual-component injection-molding method in the reinforcement 3.

The shell 2 may be shaped to form flanges 6 along one or more edges of the opening 5. In the depicted embodiment, the flanges 6 extend along each longitudinal side of the flex-element 4.

Figure 3:
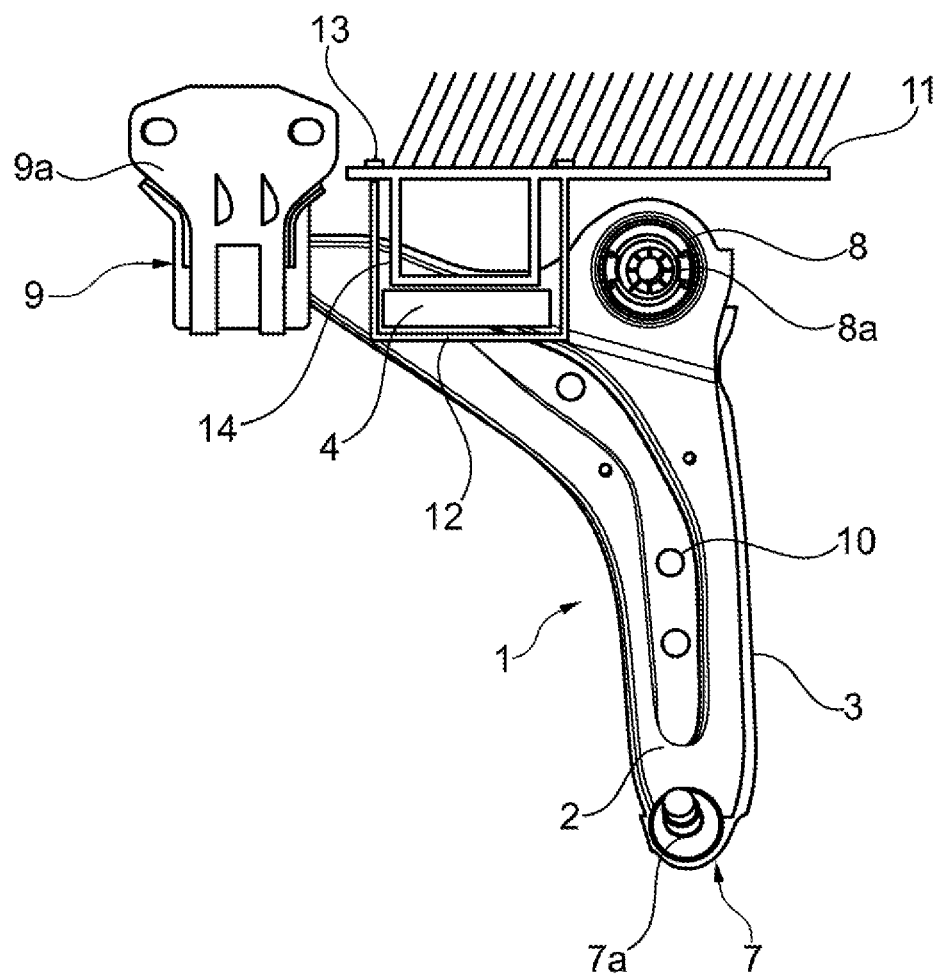
FIG. 3 is a plan view of the upper side of the control arm according to FIG. 1 in an installed position in a vehicle.

In FIG. 3, the upper side of the shell 2 can be seen as a plan view of the control arm 1 as installed in a vehicle, where the un-sprung structure 11 of the vehicle comprises a contact-element 12. The contact element 12 may, for example, extend from the structure 11 and be secured thereto by means of a screw connection 13. In the depicted embodiment, the contact-element 12 comprises a guide 14 which is disposed in close proximity to the four lateral faces 4b, 4c of the flex-element. While some amount of movement of the control arm 1 is not resisted, any movement of the control arm 1 beyond that which brings the faces 4b, 4c into contact with the contact element 12 will cause resilient deformation of the flex-element 4. During jounce and/or rebound movements of control arm 1 (along with the wheel/axle to which the control arm 1 is connected at bearing 7a, as is conventionally known), the physical interference or contact between the flex-element 4 and the contact element 12 applies force to the flex-element, causing it to deflect or deform in accordance with the action of the force. The flex-element 4 thereby acts as a spring or a damper, absorbing the kinetic energy of the moving control arm 1, storing it as strain energy, and subsequently returning the stored energy to the control arm as the control arm moves relative to the un-sprung vehicle structure. Furthermore, the forces also act on the entire control arm 1, including the reinforcement 3 which can absorb a portion of the action of the force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle suspension system comprising:
    a hybrid control arm supporting two bushings for movably securing the control arm to a vehicle and including a shell formed of sheet metal having a concave under side and defining an opening, a plastic reinforcement secured to the under side, and a flex-element extending from the reinforcement toward an upper side of the shell, opposite the under side, and through the opening and beyond the upper side; and
    a contact-element disposed on the vehicle to contact the flex-element and deflect the flex-element relative to the reinforcement during jounce and/or rebound of the control arm.

2. The suspension system of claim 1, wherein the shell is formed of sheet steel.

3. The suspension system of claim 1, wherein the shell has a flange bordering the opening and extending away from the upper side and supporting the flex-element.

4. The suspension system of claim 1, wherein the reinforcement is formed of a carbon-fiber-reinforced material.

5. The suspension system of claim 1, wherein the shell and the reinforcement are secured together by mechanical locking.

6. A vehicle suspension hybrid control arm comprising:
    a shell formed of a sheet metal having a concave under side and a collar extending around a periphery thereof, and movably secured to a vehicle structure at first and second locations thereof;
    a plastic reinforcement bonded to the concave under side, and defining ribs that extend between opposite edges of the shell defined by the periphery; and
    a flex-element extending from the reinforcement toward an upper side of the shell, opposite the under side, and through an opening in the shell to contact the vehicle structure at a third location thereof, movement of the control arm relative to the vehicle causing the flex-element to deflect and thereby absorb energy.

7. The control arm of claim 6, wherein the shell is formed of sheet steel.

8. The control arm of claim 6, wherein the shell has a flange bordering the opening and extending beyond the upper side, the flange supporting the flex-element.

9. The control arm of claim 6, wherein the reinforcement is formed of a carbon-fiber-reinforced material.

10. The control arm of claim 6, wherein the shell and the reinforcement are secured together by mechanical locking.

11. A vehicle suspension hybrid control arm comprising:
    a shell formed of a sheet of a first material and supporting a bushing for movably securing the control arm to a vehicle, the shell having a concave side and an upper side opposite the concave side, the shell defining at least one opening between the concave side and the upper side, and the shell further comprising a flange bordering the opening and extending away from the upper side;
    a reinforcement formed of a reinforced plastic material bonded to the concave side of the shell; and
    a flex-element extending from the reinforcement, passing through the opening and away from the upper side, and supported by the flange, the flex-element contacting un-sprung vehicle structure and being deflected by the contact during jounce and/or rebound of the control arm.

12. The control arm of claim 11, wherein the shell is formed of sheet steel.

13. The control arm of claim 11, wherein the reinforcement is formed of a carbon-fiber-reinforced material.

14. The control arm of claim 11, wherein the shell and the reinforcement are secured together by mechanical locking.

* * * * *